United States Patent [19]
Douglas et al.

[11] 3,916,997
[45] Nov. 4, 1975

[54] OIL RECOVERY WITH HIGH CONDUCTIVITY MICELLAR SYSTEMS

[75] Inventors: Larry J. Douglas; Charles B. Wenger, both of Denver, Colo.

[73] Assignee: Marathon Oil Company, Findlay, Ohio

[22] Filed: Sept. 13, 1973

[21] Appl. No.: 397,026

[52] U.S. Cl. ............... 166/275; 166/252; 166/274
[51] Int. Cl. ........................................... E21b 43/16
[58] Field of Search ........... 166/250, 252, 273–275; 252/8.55 D

[56] References Cited
UNITED STATES PATENTS

| | | |
|---|---|---|
| 3,254,714 | 6/1966 | Gogarty et al. ............. 166/274 |
| 3,477,511 | 11/1969 | Jones et al. ................ 166/275 |
| 3,493,048 | 2/1970 | Jones ......................... 166/252 |
| 3,536,136 | 10/1970 | Jones ......................... 166/252 |
| 3,578,082 | 5/1971 | Davis et al. ................. 166/252 |
| 3,643,738 | 2/1972 | Dreher et al. .............. 166/252 |
| 3,658,130 | 4/1972 | Davis et al. ................. 166/273 |
| 3,722,590 | 3/1973 | Froning et al. ............. 166/273 |

OTHER PUBLICATIONS

Dreher et al., "On Determining The Continuous Phase In Microemulsions," JPT Forum, Dec. 1971, pp. 1437 and 1438.

Primary Examiner—Stephen J. Novosad
Assistant Examiner—Jack E. Ebel
Attorney, Agent, or Firm—J. C. Herring; Richard C. Willson, Jr.; J. L. Hummel

[57] ABSTRACT

Improved oil recovery can be obtained by flooding with oil-external micellar systems having an electrical conductivity above about $5 \times 10^{-5}$ ohm$^{-1}$ centimeter$^{-1}$. Such conductivities can be obtained varying slug constituents, e.g., surfactant, cosurfactants, cyclohexanone, isopropyl alcohol, and the concentrations of the constituents.

11 Claims, 3 Drawing Figures

OIL RECOVERY WITH HIGH CONDUCTIVITY MICELLAR SYSTEMS

BACKGROUND OF THE INVENTION

1. Field of the Invention

The present invention relates to the recovery of crude oil from oil-bearing subterranean formations through use of micellar systems, classified generally in the United States Patent Office Class 166, subclasses 273 and 252.

2. Description of the Prior Art

Much patent and non-patented literature has been published regarding the formulation of micellar systems for the optimum recovery of petroleum from subterranean formations. The figure of U.S. Pat. No. 3,254,714 shows an abrupt change in electrical conductivity at the point where the system inverts from oil-external to a water-external system and a very large increase in viscosity at the inversion point.

The present invention embodies the discovery of another abrupt increase in electrical conductivity occurring within oil-external micellar systems, which is not accompanied by any major change in viscosity and not accompanied by inversion.

SUMMARY

General Statement of the Invention

According to the present invention, there are employed in secondary-type oil recovery, oil-external micellar systems which exhibit a relatively high electrical conductivity within the range of $5 \times 10^{-5}$ to $10^{-1}$, preferably between $5 \times 10^{-4}$ to $0.5 \times 10^{-1}$ and more preferably between $5 \times 10^{-3}$ and $10^{-2}$ ohm$^{-1}$ centimeter$^{-1}$. The oil in the micellar systems is miscible with hydrocarbons and substantially immiscible with NaCl brines. They exhibit a surface tension of less than about 32 dynes per centimeter, more preferably less than about 30, and most preferably less than about 27 dynes per centimeter. In most instances, the surface tension will be above about 22 dynes per centimeter.

"Electrical conductivity" as utilized herein is measured by a conventional conductivity bridge such as that described in E. C. Potter, "Electro-Chemistry," Cleaver-Hume Press Ltd., London (1961). "Surface tension" as used herein is measured by the conventional pendant drop technique as described in Harkins, W. D., and Brown, F. E., J. Amer. Chem. Soc. 41 499 (1919), Adamson, A. W. "Physical Chemistry of Surface" Interscience Pub. N.Y. (1967).

It has been observed that the conductivity of the micellar systems of the present invention can move back and forth across the region of abrupt change in conductivity as temperature is varied. This phenomenon is reversible, indicating no irreversible fundamental change in the physical or chemical nature of the systems. Therefore the micellar system must be designed to have the desired conductivity at the particular temperature prevailing in the formation.

DESCRIPTION OF THE PREFERRED EMBODIMENTS

Figure 1:
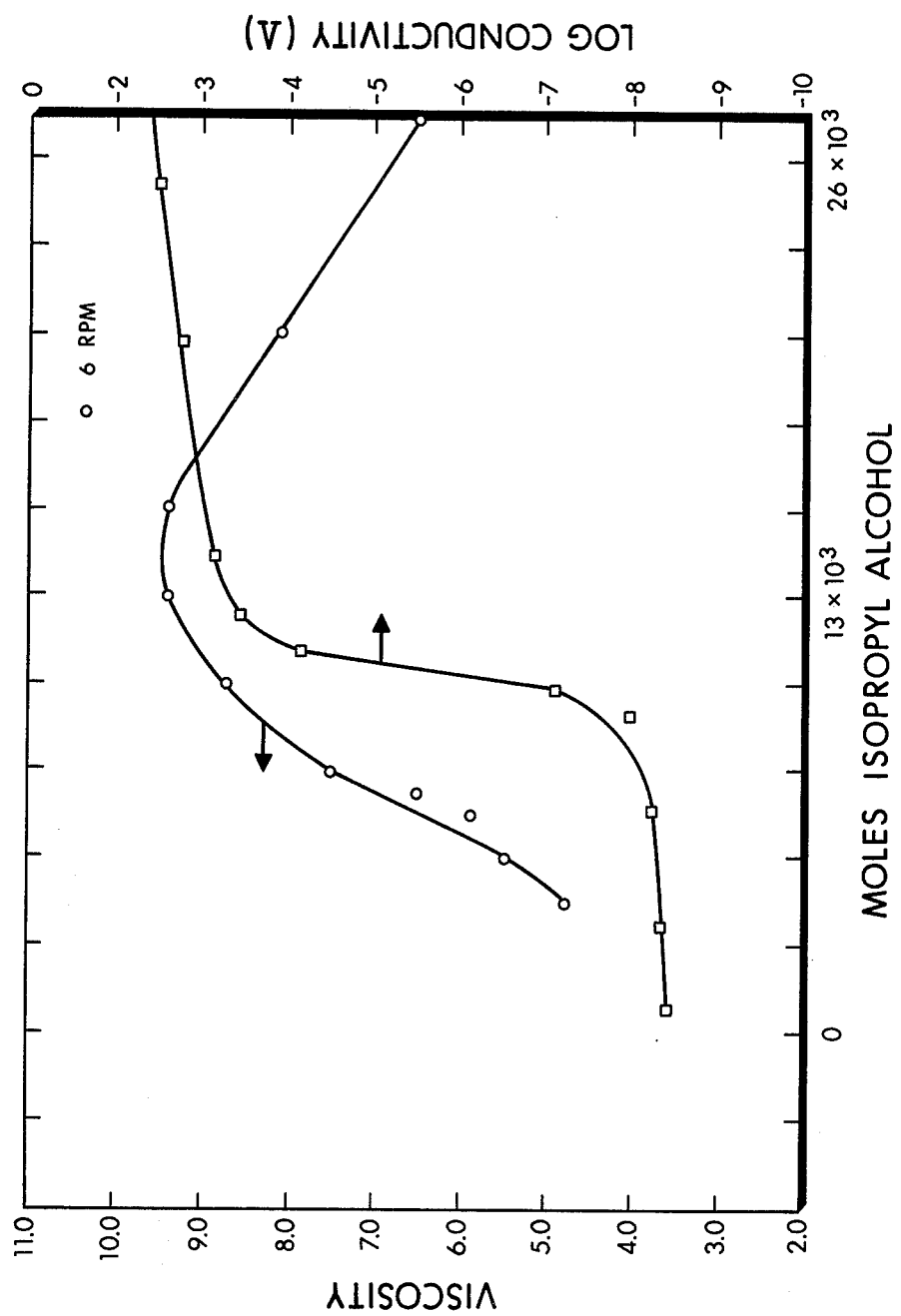
FIG. 1 is a graph of composition versus conductivity and viscosity for a typical micellar system.
Figure 2:
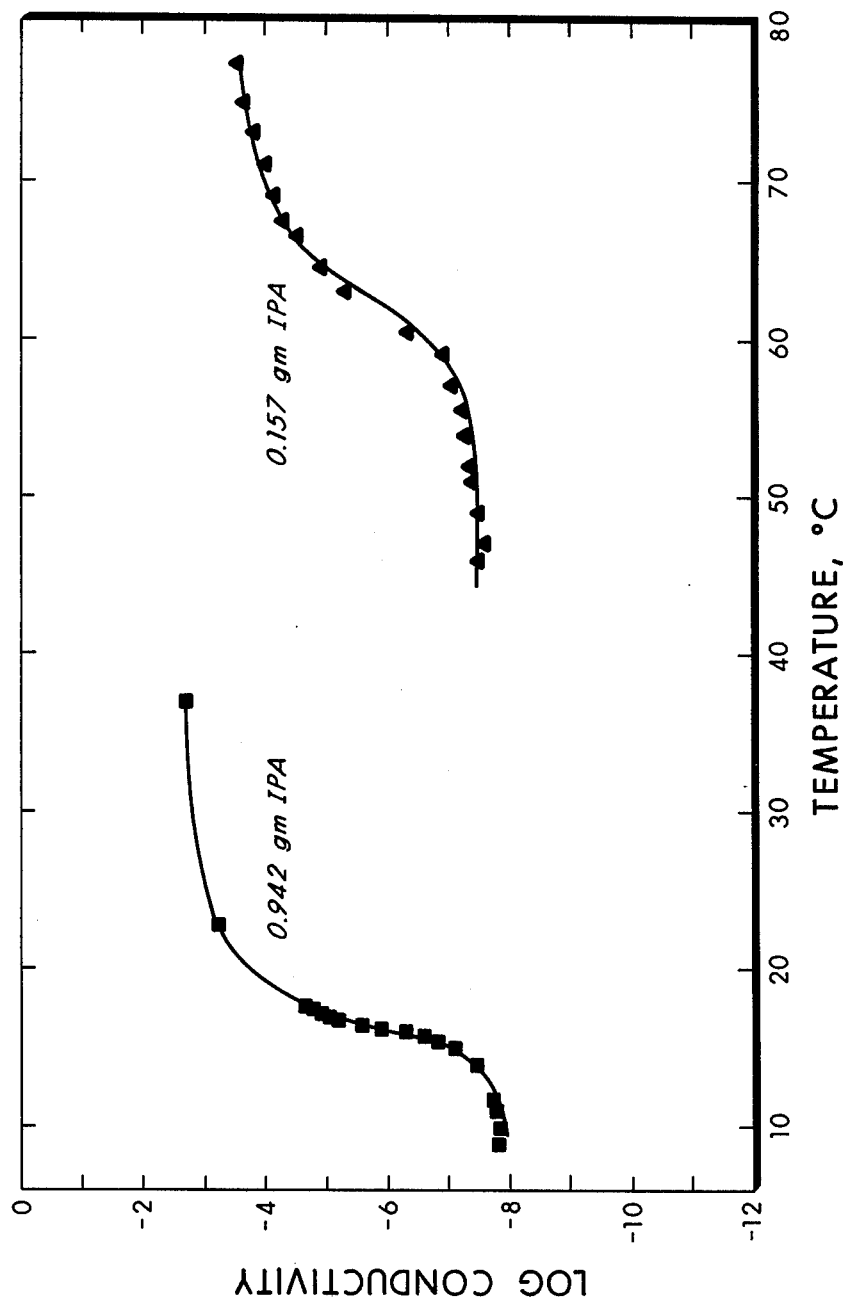
FIG. 2 is a graph of conductivity versus temperature.

Micellar Dispersions: The micellar dispersions useful in this invention are composed of hydrocarbon, aqueous medium, and surfactant sufficient to impart micellar dispersion characteristics to the dispersion. In addition, cosurfactant(s) and electrolyte(s) are optionally useful in the micellar dispersion.

The term "micellar dispersion" as used herein is meant to include micellar solutions, microemulsions, oleopathic hydro-micelles, "transparent" emulsions, "fine" emulsions, and micellar solution technology taught in C. G. Sumner, Clayton's, The Theory of Emulsions and Their Technical Treatment, Fifth Edition, pp. 315–320 (1954). The examples of useful micellar solutions include those defined in U.S. Pat. Nos. 3,254,714 to Gogarty et al; 3,275,075 to Gogarty et al; 3,301,325 to Gogarty et al; 3,307,628 to Sena, and 3,348,611 to Reisberg. The micellar dispersion of this invention can be oil-external.

Hydrocarbons: Hydrocarbons useful in the micellar dispersions include crude oil (both sweet and sour) partially refined fractions of crude oil, refined fractions thereof, and liquefied petroleum gases.

Water: The aqueous medium can be soft, brackish, or a brine. Preferably, the water is soft, but it can contain small amounts of salts which do not precipitate on contact with the ions within the subterranean formation being flooded.

Surfactants: Surfactants useful with the dispersions include both cationic and anionic surfactants. Examples of such surfactants include sodium glyceryl monolaurate sulfate, dihexyl sodium succinate, hexadecylnaphthalene sulfonate, diethyleneglycol sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium suflate, and triethanolamine laurate or triethanolamine oleate. Other useful surfactants include Duponol. WAQE (a 30 percent active sodium lauryl sulfate marketed by Du Pont Chemical Corporation, Wilmington, Del.), Energetic W100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12-50 (a 50 percent active dodecyl trimethyl ammonium chloride marketed by Armour Chemical Company, Chicago, Ill.), and like materials.

Petroleum sulfonates (i.e., surfactants) are also useful with the dispersion, they are also known as alkyl aryl naphthenic sulfonates. Such can be obtained by sulfonating at least a portion of a sulfonatable hydrocarbon (e.g., gas oils) and then neutralizing the mixture, e.g., with $NH_4OH$, NaOH, etc. The sulfonate can contain, after extraction, e.g. 60–100 percent active sulfonate. Unsulfonated hydrocarbon within the sulfonates is useful as the hydrocarbon within this invention. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

Cosurfactants: The cosurfactants, also known as cosolubilizers or semipolar organic compounds, useful with this invention include alcohols, amino compounds, esters, aldehydes and ketones containing from 1 to about 20 or more carbon atoms and more preferably from about 3 to about 16 carbon atoms. The cosurfactant is preferably an alcohol, e.g., isopropanol, n- and isobutanol, the amyl alcohols such as n-amyl alcohol, 1- and 2-hexanol, 1- and 2-octanol, decyl alcohols, alkaryl alcohols such as p- nonyl phenol and alcoholic liquors such as fusel oil. Particularly useful alcohols include isopropanol, the primary butanols, primary pentanols and primary and secondary hexanols. Concentrations within the range of from about 0.01 percent to about 20 percent or more by volume of cosurfactant are useful in the micellar dispersion and more preferably from about 0.1 to about 5.0 percent. Mixtures of two or more cosurfactants are useful.

Electrolytes: Examples of electrolytes include inorganic bases, inorganic acids, inorganic salts, organic bases, organic acids, and organic salts which are strongly or weakly ionized. Preferably, the electrolytes are inorganic bases, inorganic acids, and inorganic salts, e.g., sodium hydroxide, sodium chloride, sodium sulfate, hydrochloric acid, sulfuric acid, and sodium nitrate. Examples of other useful electrolytes can be found in U.S. Pat. No. 3,330,343. The type and concentration of electrolyte will depend on the aqueous medium, surfactant, cosurfactant, and hydrocarbon. Generally from about 0.1 percent to about 4 percent or more by weight of electrolyte is useful, percents based on aqueous medium. The electrolyte can be the salts within brackish or brine water.

Temperature: In general, the temperature at which the micellar system is to be utilized, i.e., the temperature prevailing in the actual formation, should be used as the reference point to which the formulation should be designed and conductivities, etc. should be measured at or near that temperature. Stability of the micellar system at ambient temperature expected to occur during the injection operation should, of course, also eject. However, the thermal stability of the compositions employed with the invention has been found to be generally excellent.

Formulation of the Micellar System: Micellar systems can be prepared according to the techniques of the aforementioned prior art. In general, preferred micellar systems will contain 5–20 weight percent surfactants, 5–60 percent hydrocarbon, 10–60 percent electrolyte solution in water, and about 1–5 percent cosurfactant. More preferred formulations will contain 5–15 percent surfactant, 25–60 hydrocarbon, 20–50 percent electrolyte solution in water, and about 1–3.5 percent cosurfactant. More preferred micellar systems will contain from about 5–10 percent surfactant, about 45–55 percent hydrocarbon, about 25–35 percent electrolyte in water, and about 1–2.5 percent cosurfactant.

Other Techniques: Size of the micellar dispersion slug useful with this invention is from about 1 percent to about 20 percent formation pore volume. Larger pore volumes are useful but such may be economically unattractive. More preferably, from about 2 percent to about 10 percent formation pore volumes are useful and from about 3 percent to about 6 percent formation pore volumes give very efficient results.

This invention is not to be limited by the specifics taught herein. Rather, all equivalents obvious to those skilled in the art are meant to be included within the scope of the invention as defined in the specification and appended claims.

In general, the techniques of recovery of pretroleum including substantially all of those taught in the above-described prior art, are applicable to the present invention.

EXAMPLES

EXAMPLES I–VI and VIII (Core floods with micellar systems according to the present invention. Examples II, IV, VI, and VIII v. Secondary recovery using prior art micellar systems for comparison purposes (Ex. I, III, and V)).

In each of the examples, a micellar system is prepared having the composition described for each of the examples in Table I. A quantity of the micellar system, equivalent to 0.02 pore volumes of the core is injected into a 3 inches diameter by 4 foot long Berea sandstone core. The Berea core is prepared by first saturating with water, then being oil flooded, e.g., North Crawford County's pipeline crude oil, Illinois Basin crude oil, to residual water (that is, until no more water is emitted from the core), then water-flooded to residual oil (that is, until no additional oil is emitted from the core), using a simulated connate water. The water-flooded Berea core at this point simulates an oil field after conventional water flooding. A 0.02 pore volume slug (except in Example III where the slug was 0.05 pore volume) is then injected into the core to displace residual oil. Injection of the micellar dispersion is followed by injection of a drive fluid consisting of 0.95–1.05 pore volumes of 1000 ppm polyacrylamide solution in treated synthetic Palestine water. The "oil recovery" is calculated as the volume percent of the residual oil in place after water-flooding which residual oil is displaced during the injection process.

As shown in Table I under Examples II, IV, VI, and VIII, the oil recovery utilizing the present invention is in each instance, superior to that achieved when utilizing substantially identical quantities and compositions of micellar systems except that the composition is varied by utilizing a lesser amount of isopropyl alcohol (IPA) and the conductivities are substantially lowered in the comparative Examples I, III, and V.

TABLE I

| OIL RECOVERY AND CONDUCTIVITY.* | | | | | |
|---|---|---|---|---|---|
| Example | %$H_2O$ | Conductivity (ohm$^{-1}$ cm$^{-1}$) | Viscosity (cp) | M/S.IPA | Oil Recovery |
| I | 25.4 | $3 \times 10^{-8}$ | 5.5 | 0.8 | 53.5% |
| II** | 24.8 | $4.6 \times 10^{-4}$ | 9.4 | 1.6 | 78.7% |
| III | 35.9 | $2.6 \times 10^{-7}$ | 8.2 | 0.8 | 62.2% |
| IV** | 35.4 | $1.1 \times 10^{-3}$ | 12.9 | 1.6 | 76.3% |
| V | 25.4 | $4.0 \times 10^{-8}$ | 5.5 | 0.8 | 55.0% |
| VI** | 24.8 | $7.25 \times 10^{-4}$ | 9.4 | 1.6 | 80.5% |
| VII | 25.0 | $4.65 \times 10^{-8}$ | 6.5 | 0.95 | 64.1% |
| VIII** | 24.2 | $1.75 \times 10^{-3}$ | 6.6 | 2.5 | 76.3% |
| Example | Weight of Hydrocarbon* (g) | | Weight of Sulfonate (g) | | |
| I | 19.7 | | 4.36 | | |
| II | 19.7 | | 4.36 | | |
| III | 17.2 | | 3.81 | | |
| IV | 17.2 | | 3.81 | | |
| V | 19.7 | | 4.36 | | |
| VI | 19.7 | | 4.36 | | |
| VII | 19.7 | | 4.36 | | |
| VIII | 19.7 | | 4.36 | | |

*Kerosene
**According to Invention

EXAMPLE VII (Demonstrating that viscosity is not a function of electro-conductivity)

Referring to Table I, comparison of Example VII with Example VIII (according to the invention) indicates that, although the viscosities are deliberately matched to be practically identical, the recovery achieved by comparative Example VII utilizing a lower electrical conductivity micellar system is substantially less than that achieved according to the invention by Example VIII which has a substantially higher electrical conductivity. The lack of correlation between viscosity and electrical conductivity is further illustrated by reference to FIG. 1 in which a curve of viscosity and a curve of log of electrical conductivity are superimposed and plotted as a function of the concentration of the cosurfactant (IPA).

EXAMPLE IX (Demonstrating that the invention provides advantages which are equivalent to the use of much larger slug sizes)

When slugs having compositions identical to those of Examples I and II, respectively, are utilized according to the techniques described in Example I, except that 0.05 pore volumes of slug are injected, the recovery achieved in both runs is approximately identical with that of Example II. This demonstrates that the advantage obtained by the invention is the equivalent of the use of a much larger pore volume of slug. In short, Example II (according to the invention) gave the same results in terms of oil recovery as did the use of 2½ times as much of the conventional slug having the composition described in Example I.

EXAMPLE X (Demonstrating that the electrical conductivity discontinuity is not accompanied by any irreversible physical change in the system)

Figure 3:
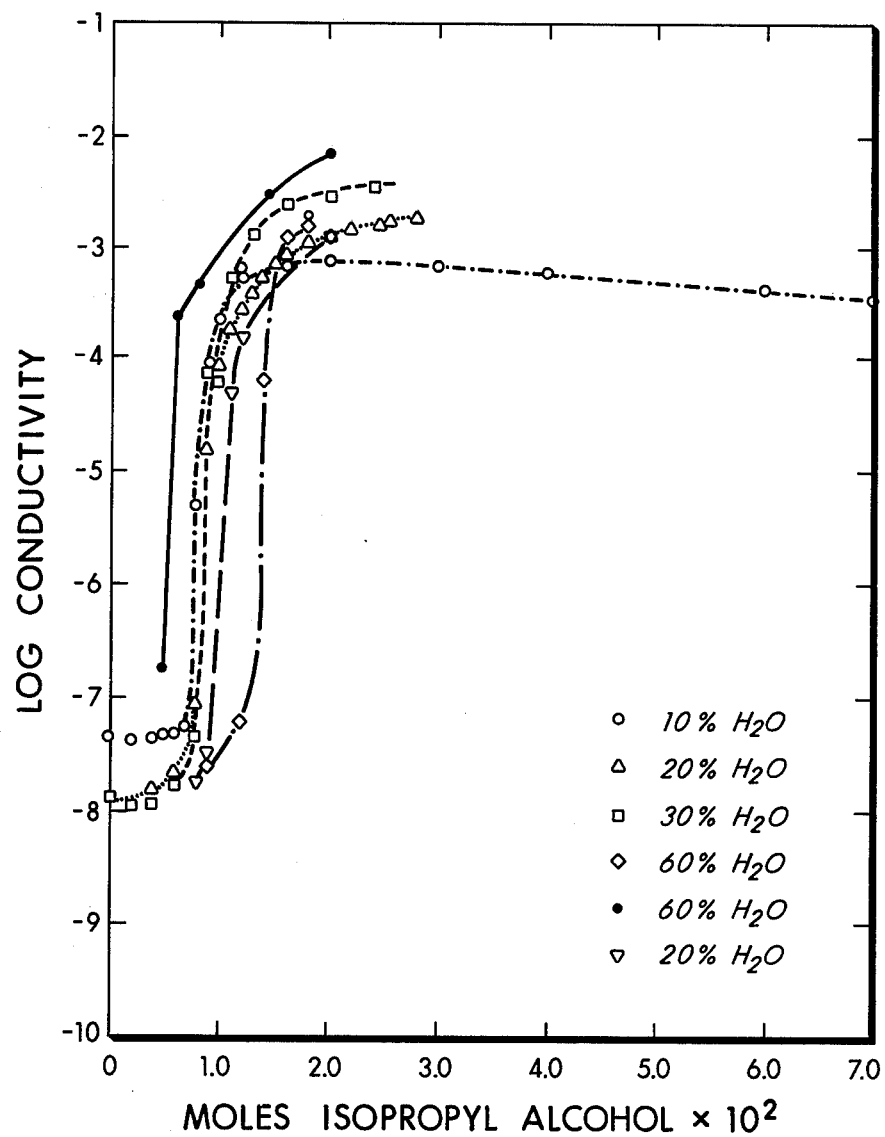
FIG. 3 is a graph of conductivity versus cosurfactant (IPA) content for various water contents.

Referring to FIG. 3, it can be seen that the high and low alcohol slugs can move back and forth across the discontinuity in electrical conductivity.

EXAMPLE XI (Demonstrating the applicability of the invention to a wide range of concentrations of water)

Referring to FIG. 4, it can be seen that the invention is relatively insusceptible to wide ranges of variation of water content.

EXAMPLE XII (Use of the systems of the invention in secondary recovery under field conditions)

A micellar system prepared according to the techniques of Example II is injected into an injection well which is perforated to communicate with an oil-bearing formation. As the injection of the residual oil is gradually displaced toward a production well and produced oil is forced from the production well. 4, 2.

MODIFICATIONS OF THE INVENTION

It should be understood that the invention is capable of a variety of modifications and variations which will be made apparent to those skilled in the art by a reading of the specification and which are to be included within the spirit of the claims appended hereto.

For example, a process for the recovery of petroleum by injection of a quantity of micellar system comprising surfactants and cosurfactants into subterranean oil-bearing reservoirs by:

a. preparing a series of micellar systems identical except for different cosurfactants,
b. measuring the electroconductivity of each (according to techniques set forth in the Specification from line 24, page 2 through line 4 of page 3,
c. measuring the adsorption of each micellar system onto surfaces representative of surfaces to be encountered in said reservoir, and
d. selecting the optimum micellar system from a correlation of adsorption with conductivity.

What is claimed is:

1. In a process for the secondary-type recovery of petroleum by injection of micellar systems into subterranean petroleum-bearing reservoirs, the improvement comprising utilizing as said micellar systems oil-external compositions having electrical conductivities of at least about $5 \times 10^{-5}$ ohm$^{-1}$ centimeter$^{-1}$.

2. In a process for the recovery of petroleum comprising injecting micellar systems into subterranean oil-bearing formations, the improvement comprising in combination formulating said micellar systems so that they comprise:

a. from about 3 to about 20 weight percent of surfactant,
b. from about 5 to about 60 percent by weight water containing electrolyte,
c. from about 10 to about 60 percent by weight hydrocarbon, and
d. cosurfactant in a quantity sufficient to provide a micellar system having an electrical conductivity above about $5 \times 10^{-5}$ ohm$^{-1}$ centimeter$^{-1}$, wherein said micellar system is oil-external.

3. A process according to claim 1 wherein said micellar system has a surface tension of less than about 27 dynes per centimeter.

4. A process according to claim 3 wherein said micellar system is formulated to be completely miscible with oil and substantially immiscible with water-containing electrolytes.

5. A process according to claim 4 wherein said micellar system is formulated to be completely miscible with oil and substantially immiscible with water-containing electrolytes.

6. A process according to claim 2 wherein said cosurfactant is selected from the group consisting of isopropyl alcohol, amyl alcohol, hexyl alcohol, cyclohexanone, and acetone.

7. A process according to claim 3 wherein said cosurfactant is selected from the group consisting of isopropyl alcohol, amyl alcohol, hexyl alcohol, cyclohexanone, and acetone.

8. A process according to claim 4 wherein said cosurfactant is selected from the group consisting of isopropyl alcohol, amyl alcohol, hexyl alcohol, cyclohexanone, and acetone.

9. A process according to claim 5 wherein said cosurfactant is selected from the group consisting of isopropyl alcohol, amyl alcohol, hexyl alcohol, cyclohexanone, and acetone.

10. A process according to claim 2 wherein said electrolytes comprise from about 5 to about 60 percent by weight based on the weight of water of a salt selected from the group consisting of NaCl, Na$_2$SO$_4$ KCl, K$_2$SO$_4$, KOH, and CaCl$_2$.

11. In a process for secondary-type recovery of petroleum by injecting of micellar systems into subterranean petroleum-bearing reservoirs, the improvement comprising preparing said micellar systems by mixing together a surfactant, water, and cosurfactant, the amount of said cosurfactant being just sufficient to obtain a predetermined electrical conductivity which is greater than about $5 \times 10^{-5}$ ohm$^{-1}$ centimeters$^{-1}$.

* * * * *

UNITED STATES PATENT OFFICE
CERTIFICATE OF CORRECTION

Patent No. 3,916,997          Dated      Nov. 4, 1975

Inventor(s) LARRY J. DOUGLAS ET AL

It is certified that error appears in the above-identified patent and that said Letters Patent are hereby corrected as shown below:

Col. 2, line 43:            Delete "suflate" and insert therefor --sulfate--.

Col. 3, line 40:            Delete "temperature" and insert therefor --temperatures--.

Col. 4, line 3:            Delete "pretroleum" and insert --petroleum--.

Table 1, Heading:           Delete "M/SIPA" and insert therefor --Mls.IPA--.

Example XII, Col. 5, line 61:    After "injection" insert --continues,--; delete "of".

Col. 5, line 63:            Delete "4,2.".

Signed and Sealed this

Sixth Day of September 1977

[SEAL]

Attest:

RUTH C. MASON          LUTRELLE F. PARKER
*Attesting Officer*       *Acting Commissioner of Patents and Trademarks*

Disclaimer 3,916,997.—*Larry J. Douglas and Charles B. Wenger*, Denver, Colo. OIL RECOVERY WITH HIGH CONDUCTIVITY MICELLAR SYSTEMS. Patent dated Nov. 11, 1975. Disclaimer filed July 6, 1981, by the assignee, *Marathon Oil Co.*

Hereby enters this disclaimer to claims 5 and 9 of said patent.
[*Official Gazette August 22, 1981.*]